3,390,666
SUPPORT AND GUIDE FOR LARGE ECCENTRICALLY LOADED FLUID COOLED DUCT OR HOOD
Leroy M. Fink and Thomas B. Hurst, Akron, Ohio, assignors to The Babcock & Wilcox Company, New York, N.Y., a corporation of New Jersey
Filed Jan. 16, 1967, Ser. No. 609,516
7 Claims. (Cl. 122—7)

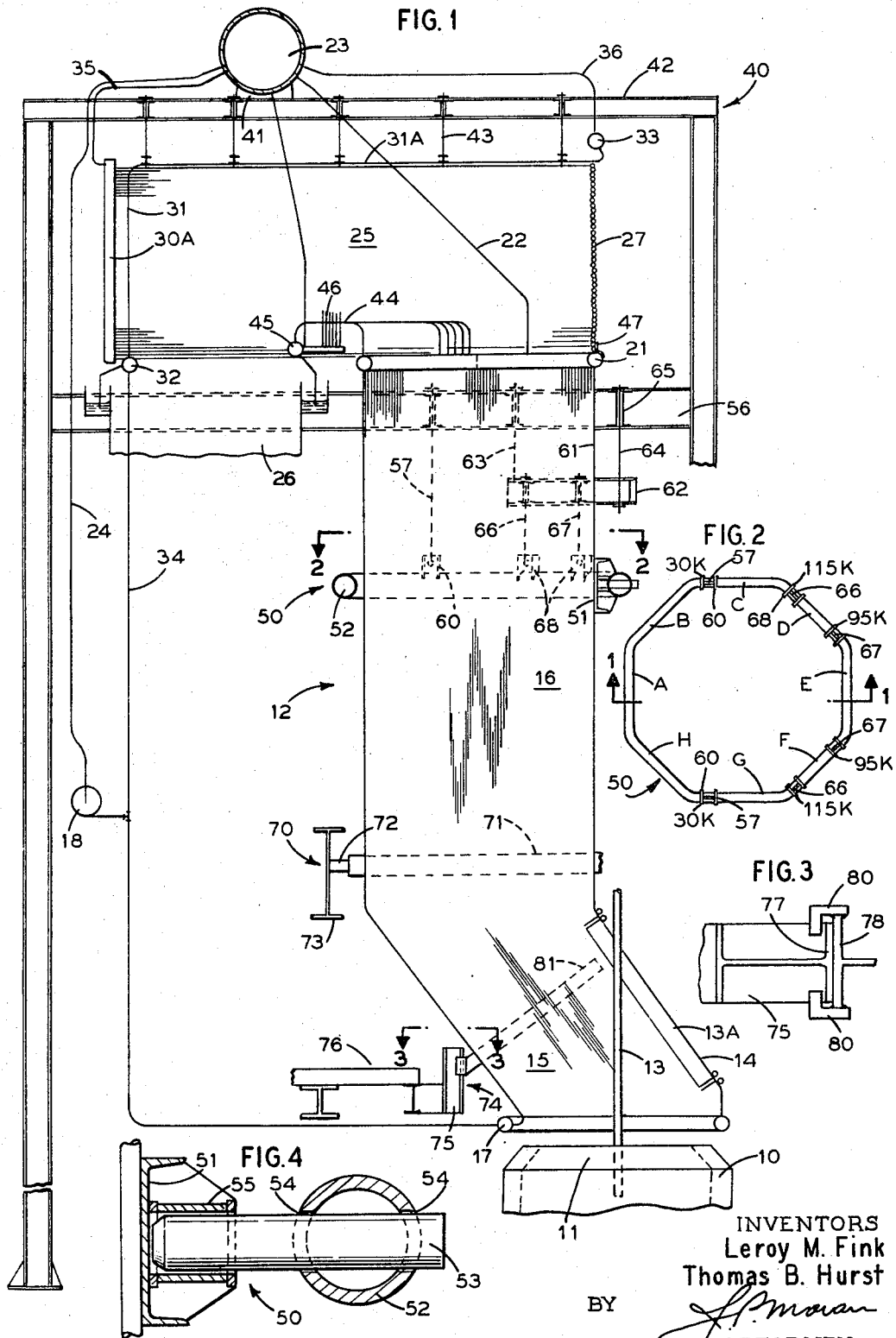
July 2, 1968 — L. M. FINK ET AL — 3,390,666
SUPPORT AND GUIDE FOR LARGE ECCENTRICALLY LOADED FLUID COOLED DUCT OR HOOD
Filed Jan. 16, 1967
INVENTORS
Leroy M. Fink
Thomas B. Hurst
ATTORNEY United States Patent Office 3,390,666
Patented July 2, 1968

ABSTRACT OF THE DISCLOSURE

An arrangement of supporting and guiding means for directing the thermal movement of large eccentrically loaded fluid cooled hoods, as used to confine the flow of hot gases from a basic oxygen steel furnace.

---

The present invention relates to heat exchange apparatus and more particularly to a fluid cooled duct or hood for confining a periodic flow of high temperature gases from a basic oxygen furnace.

The fluid cooled hood structure utilized to confine the flow of gases from a basic oxygen furnace is customarily arranged to provide a gas flow path from the furnace to a quench chamber or the like where the gases from the furnace are conditioned for dust removal. In many installations the hood is constructed with an offset or inclined lower end portion merging into a vertical or upright portion which directs the gas flow to a location considerably above the level of the furnace discharge opening. The vertical distance between the furnace gas outlet and the point of gas discharge from the hood may be of the order of 100 feet, or more. Under these conditions the means for supporting and guiding the fluid cooled hood presents a rather difficult problem during thermal movement of the hood. One of the conditions of such guide movement relates to the desirability of maintaining the vertical alignment relationship between the discharge opening of the furnace and the gas inlet opening of the hood. It is highly desirable to maintain this alignment relationship throughout the operation cycle of the furnace and hood so as to minimize uncontrolled admission of air to the gases discharging from the furnace to the hood, and to protect the inclined upper surface of the hood. It will be appreciated that impingement of slag or molten iron on the inclined wall of the hood above the furnace outlet may lead to maintenance problems in the hood.

In accordance with the present invention we support an upwardly elongated hood at a fixed position intermediate the length of the upright portion of the hood so that the weight of the hood is pendently supported from overhead steel work. Thermal expansion of the hood will occur in vertical directions, as well as in horizontal directions where the latter movements are relatively smaller but complicate the need for maintaining the vertical axial alignment between the furnace discharge opening and the inlet opening of the hood. We utilize a guiding arrangement including a buffer structure to maintain expansion and contraction in a substantially vertical direction throughout operational temperature changes in the hood.

Of the drawings:

FIG. 1 is an elevation, in section, of an oxygen furnace hood and gas-turning chamber constructed and arranged in accordance with the present invention;

FIG. 2 is a plan view of the hood taken on line 2—2 of FIG. 1;

FIG. 3 is a plan, partly in section, of a portion of the structure taken on line 3—3 of FIG. 1; and FIG. 4 is an enlarged elevation of a portion of the structure shown in FIG. 1.

As shown in FIG. 1 an oxygen steel furnace or vessel 10 is positioned to discharge gases upwardly through the open upper mouth 11 of the furnace and through a hood 12 during the refining portion of the steel making process. As shown, the lance 13 projects vertically through an opening formed in upper inclined wall 14 of the hood, where the opening is formed by displacing tubes in the hood wall as shown for example in U.S. Patent 3,168,073. It is usually customary to provide an access door in the upper inclined wall 14 of the hood 12 for access thereto, as also disclosed in the said patent, and indicated generally by number 13A.

The hood 12 is constructed with a lower inclined portion 15 merging upwardly into an elongated substantially vertically extending portion 16 where the walls of the hood are lined by panels of co-planar tubes. In the embodiment illustrated in FIG. 2 the panels A, B, C, D, E, F, G and H are joined at their corners to form a closed octagonal cross-section hood structure. It is of course understood that the cross-sectional configuration of the hood may be circular or of any polygonal shape.

As disclosed in U.S. Patent 3,168,073 and shown generally in FIG. 1 a cooling fluid, such as water, is delivered to the lowermost header 17 of the hood from one or more pumps 18 located in the fluid circulated portion of the system. The lower header may be formed as a continuous ring or may be constructed of a series of structurally connected separate headers where each of the tubes in each of the panels defining the walls of the hood open to the header 17 for supply of fluid thereto. The cooling fluid is forced upwardly through the tubes to discharge into an upper header 21 which is positioned at the upper end of the hood 12. The upper header serves as a collector and discharges a steam and water mixture through suitable connecting conduits, such as indicated at 22, into the steam and water drum 23 which is positioned above the hood structure. The pumps 18 are provided with water from the steam and water drum 23 through suitable downcomers 24.

As shown in FIG. 1 the gases discharged from the upper end of the hood are passed through a fluid cooled gas turning chamber 25 where the gases pass through a 180° turn to discharge downwardly to the open upper end of a gas quencher 26. A suitable quencher is illustrated in co-pending application S.N. 574,275.

In the structure shown in FIG. 1 the chamber 25 is formed with 3 of its sides defined by an upwardly stacked row of horizontally extending U-shaped tubes 27 which receive water from an upright header 30 on one side of the chamber and discharge into a corresponding upright header 30A on the opposite side of the chamber. Between the horizontally spaced headers 30 and 30A the wall of the chamber is defined by a row of upwardly extending tubes 31 leading from a transverse horizontally disposed header 32, where the tubes are bent and extend forwardly to a discharge header 33 to define the roof of the chamber. The inlet header 32 is supplied with fluid from the pumps 18 through a supply header 34 which also supplies fluid to the upright inlet header 30. The steam and water mixture discharged from the outlet headers 30 and 33 is connected with the upper steam and water drum by suitable connecting pipes such as 35 and 36, respectively.

In effect the fluid flow system of the hood 12 and the gas-turning chamber 25 are arranged in parallel, receiving water from a common source, i.e. the pumps 18, and discharging to a common steam and water drum 23. The steam and water drum 23 is provided with the usual fittings including a steam outlet (not shown) and conventional feed water connections (not shown) to compensate for the vapor discharged from the drum.

As indicated in FIGS. 1 and 2 the portion of the discharge header 21 of the hood 12 receiving steam and water from the panels A, B and H supply steam and water to the row of horizontally extending tubes forming the floor 44 and discharge into the header 45 which is provided with external discharge connections 46 therefrom leading to the drum 23. With this construction gases discharged from the hood are confined to a flow path directed through 180° for discharge into the quencher 26.

As shown, the hood and chamber are suitably supported by structural steel work indicated generally at 40 with the steam and water drum 23 resting directly on a saddle 41 supported on a beam 42 forming the top of the structural steel work. The walls of the gas-turn chamber 25 are supported on compensating, spring loaded hangers 43 which are also supported from the fixed position of the structural steel work. As hereinafter described, the hood 12 is connected with the gas-turn chamber 25 so as to permit upward movement of the upper portion of the hood, and the gas-turn chamber an amount equal to, for example, 1" at the level of the steam discharge header 33.

In the construction shown, the lowermost tubes of the gas chamber 25 rest on the discharge header 21 of the hood 12 and are connected by a plate member 47 so as to seal the connection between the hood and the chamber against exfiltration of gases or infiltration of air.

The hood 12 is pendently supported from the structural steel work 40 at a level intermediate the height of the upper portion 16 by an encircling member 50 shown in FIGS. 1, 2 and 4. The member 50 includes a channel 51 welded to the tubes of all of the wall panels A to H, with the channel connected with an outwardly spaced encircling heavy walled tube 52 through a plurality of pins 53 spaced around the support assembly. As shown particularly in FIG. 4, each pin 53 extends through openings 54 in the tube 52 into a socket 55 welded to the channel 51.

The member 50 is suspended from beams 56 framed into the structural steelwork 40. A pair of hangers or support rods 57 extend downwardly from the beams 56 to individual brackets 60 each welded to the encircling tube 52 positioned adjacent the juncture of the panels B–C and G–H. Due to the octagonal cross-section of the illustrated embodiment of the hood, the remaining support rods are suspended from a pair of stub beams 61 positioned on opposite sides of the hood and angled to the configuration of panels D and F. The ends of the stub beams are connected by a member 62 parallel to the panel E. Each stub beam 61 is supported at one end by a hanger 63 extended downwardly from the beam 56 and at its opposite end by a hanger 64 extending downwardly from a cross-beam 65 interconnecting the beams 56. Hangers 66 and 67 extend downwardly from the stub beam 61 to corresponding brackets 68 attached to the pipe 52, as shown in FIGS. 1 and 2.

Due to the physical configuration of the hood 12 and the supporting steel, the hangers 57, 63 and 64 are each subjected, in corresponding pairs, to differential loadings. For example the hangers 57 support a load of 30,000 pounds each while the hangers 66 support a load of 115,000 pounds each and the hangers 67 support a load of 95,000 pounds each. The summation of the loads is representative of the entire dead weight of the hood 12.

With the level of the center line of the support 50 the base load position of the hood thermal expansion and contraction of the hood 12 and its connected chamber 25 will occur in opposite vertical directions, from this level. Since it is desirable to maintain the co-axial relationship between the gas inlet of the hood 12 and the discharge opening 11 of the furnace 10 during thermal movement of the hood, a guide assembly 70 is provided upwardly adjacent the point of mergence between the inclined and vertical portions 15 and 16, respectively, of the hood. This guide is positioned on opposite sides of the hood with the guide so constructed as to permit vertical movement which is substantially unrestrained, with a limited amount of horizontal expansion of the hood due to temperature increases in the hood walls, while prohibiting any substantial horizontal swaying of the hood assembly.

The guide assembly 70 is formed in part by a buckstay 71 which encircles the hood and is welded to the tubes of the panels A–H. The buckstay is formed with an outwardly facing vertical slot with rigid opposite facing side walls on diametrically opposite walls of the hood. A preferred position is in the mid-section of the panels A and E (FIG. 2) with a vertically elongated finger 72 attached to a supporting beam 73 in the structural steel work 40. The finger 72 extends into the corresponding vertical slot of the buckstay with the side to side horizontal dimensions of the finger being approximately ⅛" less than the width of the mating slot. The clearance between the end of the finger and the surface of the slot should be approximately ½" on each assembly 70 when the hood is being erected, i.e. in an ambient temperature condition. Such clearance values would be appropriate to a hood 12 and chamber 25 overall height of the order of 100 feet and a transverse horizontal dimension (between the flats of panels A and E) of approximately 18 feet. With the dimensions given the overall expansion of the hood at the location of the guide assembly 70 would be of the order of 1¹⁵⁄₁₆". Such movement would be in a downward direction at the level of the guide assembly 70 when the hood was in use.

To further guide the movement of the hood 12 a buffer structure 74 is located beneath the inclined portion 15 of the hood so as to guide the offset portion of the hood during thermal movements of the fluid cooled assembly. The buffer structure 74 is located substantially on a downward extension of the vertical centerline of the hood portion 16, and is constructed to restrain the horizontal movement of the hood 12. Such horizontal thrust is engendered by the eccentric relationship between the vertical portion 16 and the inclined portion 15 and will amount to a force of the order of 30,000 pounds exerted toward the left in FIG. 1.

The structure 74 is constructed with an upright H-section 75 rigidly attached to a structural steel supporting member assembly indicated at 76. The innermost flange 77 of the section 75 (see FIG. 3) is embraced by a vertically extending flanged member 78 which is provided with angle iron restraining members 80 attached to the upright edges of the flange. With the flange 78 attached to a buckstay 81 forming part of the hood portion 15, movement of the hood due to temperature changes will be guided in a vertical direction by relative movement between the matching surfaces of the parts 77 and 78. In the embodiment shown this relative movement will be of the order of 2¾", in a vertical direction.

What is claimed is:

1. A hood apparatus comprising panels of co-planar tubes joined to form imperforate walls of an upwardly elongated gas-pass having a substantially upright upper portion and an inclined lower portion, means for passing a hot gas upwardly through said gas-pass, means for passing a wall cooling fluid through the tubes of said gas-pass, and means for guiding the thermal movement of said gas-pass in a substantially vertical direction wherein the improvement comprises means for supporting the dead load of said gas-pass at a fixed level intermediate the height of said upright upper portion, guide means positioned on opposite sides of the lower end portion of said vertical gas-pass portion to restrain lateral movement and permit vertical movement of said apparatus, and guide means positioned beneath the inclined lower portion of said gas-pass and substantially on the vertical axis of said vertical gas-pass portion, said last mentioned guide means having a fixed vertical surface thereon slidingly engaging a vertical surface secured to panels of said co-planar tubes to restrain the horizontal thrust of said gas-pass.

2. A hood according to claim 1 wherein said gas-pass supporting means includes a horizontally disposed member encircling and attached to the imperforate walls of said gas-pass, and hanger members attached at their upper end to structural steel work and attached at their lower end to said horizontally disposed member.

3. A hood according to claim 2 wherein said hanger members are symmetrically arranged about an axial vertical plane of said elongated gas-pass.

4. A hood according to claim 3 wherein said hanger members are arranged in pairs on opposite sides of said axial vertical plane with each hanger member of each pair substantially equally loaded, and the pairs of hanger members upwardly aligned with said inclined lower portion carrying a major portion of the weight of said heat exchange apparatus.

5. A hood according to claim 1 wherein walls define a gas-turning chamber positioned at the upper gas discharge end of said heat exchange apparatus, means separately supporting said chamber and means seal connecting said chamber with the upper end of said heat exchange apparatus.

6. A hood according to claim 5 wherein the side, end and roof walls of said gas-turning chamber include rows of coplanar tubes connected for fluid flow therethrough.

7. A hood according to claim 6 wherein the tubes of said gas-turning chamber and said hood are arranged for parallel flow of cooling fluid thereto.

References Cited
UNITED STATES PATENTS 3,168,073    2/1965    Durham et al.
3,191,583    6/1965    Petritsch et al.

FOREIGN PATENTS 890,869    3/1962    Great Britain.

CHARLES J. MYHRE, *Primary Examiner.*